Sept. 5, 1967   P. B. BANKS ETAL   3,339,252
METHODS OF AND APPARATUS FOR MAKING WOUND CAPACITORS
Filed July 19, 1963   3 Sheets-Sheet 1
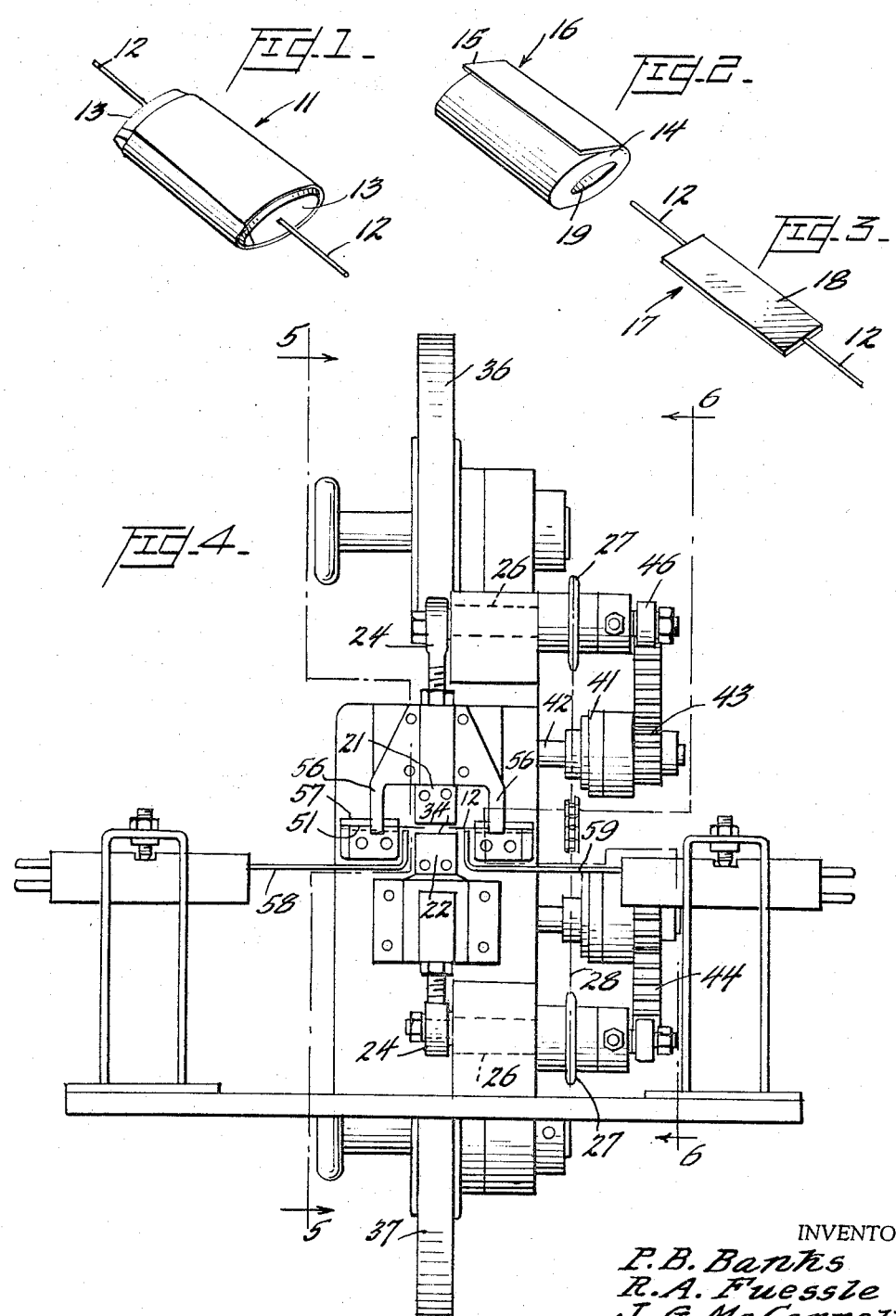
INVENTORS
P. B. Banks
R. A. Fuessle
J. G. McCarrell
BY
R. Y. Peters
ATTORNEY

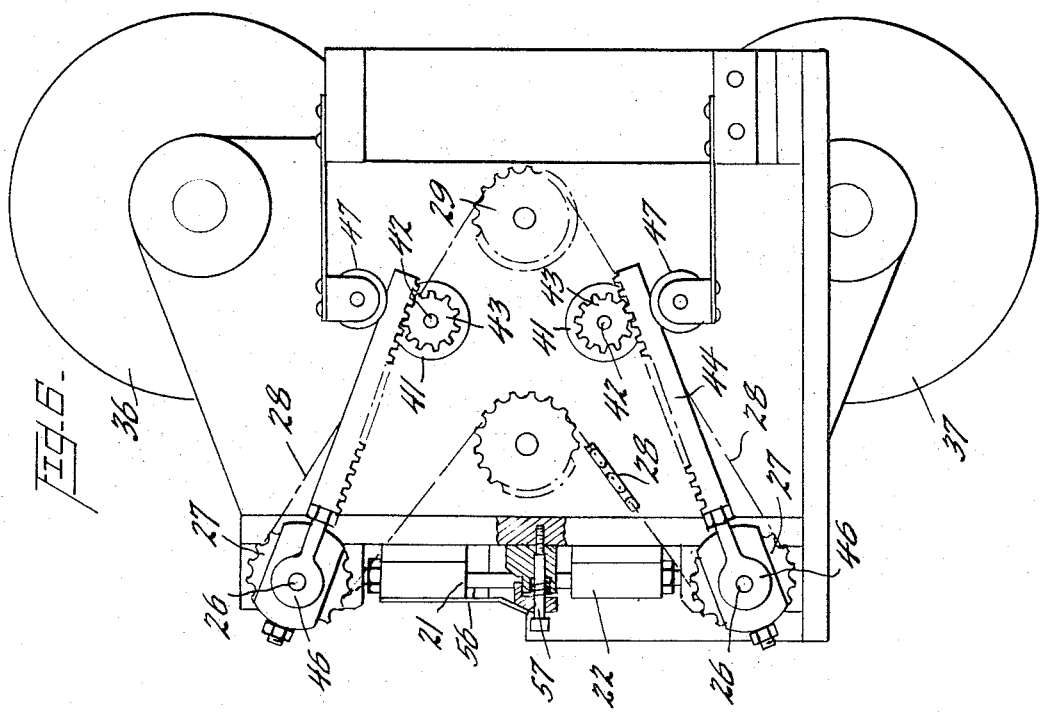

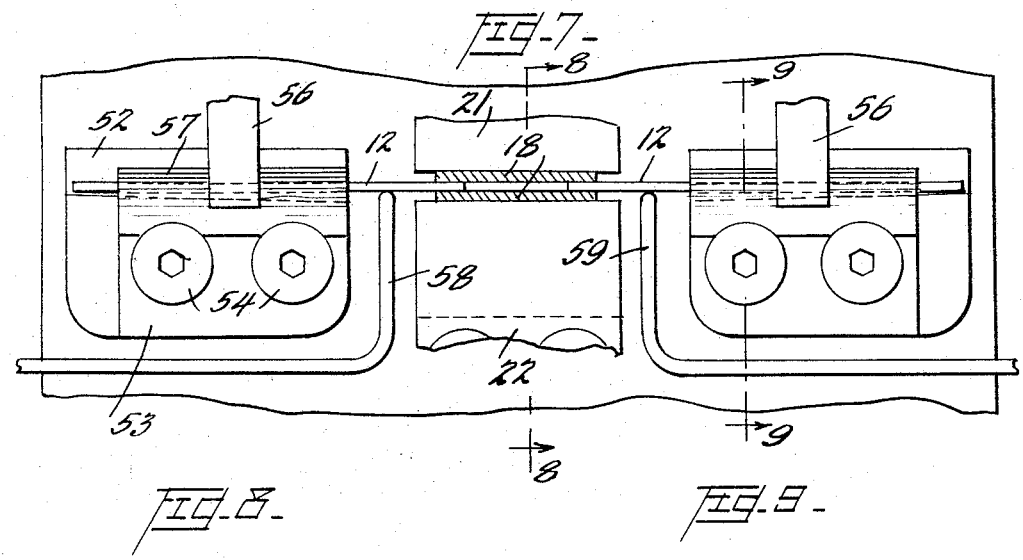
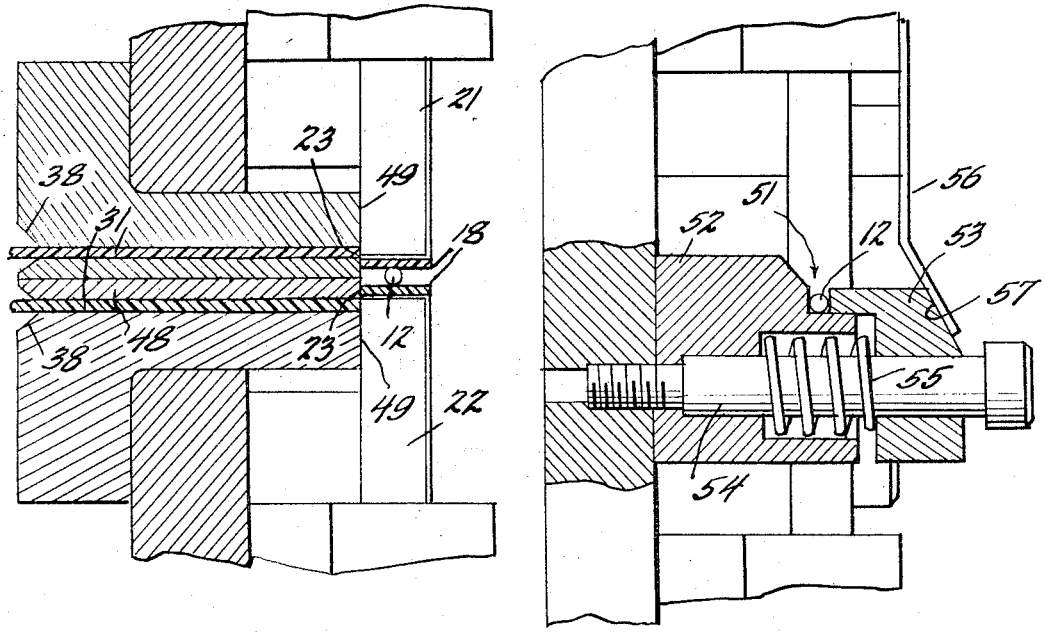

United States Patent Office 3,339,252
Patented Sept. 5, 1967

3,339,252
METHODS OF AND APPARATUS FOR MAKING WOUND CAPACITORS
Paul B. Banks, Chicago, and Robert A. Fuessle, Northbrook, Ill., and James G. McCarrell, Red Bank, N.J., assignors to Western Electric Company, Incorporated, New York, N.Y., a corporation of New York
Filed July 19, 1963, Ser. No. 296,329
8 Claims. (Cl. 29—25.42)

This invention relates to methods of and apparatus for making wound capacitors. More particularly, this invention relates to methods of and apparatus for embedding conductive terminals between plastic laminations and also relates to methods of making capacitors utilizing such laminations.

In the manufacture of capacitors using wound polyester films, such as those sold under the trademark "Mylar," it is necessary to connect terminals to metal-coated, wound "Mylar" tapes in such a manner so as to render the terminals flexible and yet maintain a strong connection of the terminals to the tapes. Flexibility is desirable to accommodate movement of the terminals during wiring of the capacitors into circuitry.

In the past, the terminals have been separately secured to the ends of a capacitor body after a solder block has been formed on both ends of the capacitor body. The terminals were heated and brought into engagement with the solder blocks to melt the solder and effectuate a connection upon the solidification of the solder. If the terminals were heated too much, the metallic coating on the "Mylar" tape would flow and the connection between the solder blocks and the metal coating would sometimes break. If the terminals were not heated enough, poor lead connections would result, which would not pass a subsequent lead-pull test.

In order to overcome the objections of this prior method, the present invention proposes, among other things, positioning a pair of wire terminals between the ends of two adjacent rectangular "Mylar" strips and coalescing the strips about the terminals with heat and pressure to form a terminal subassembly. Enlargements may be formed on the terminal ends positioned between the plastic strips and flattened by the applied pressure thus providing a stronger bond between the terminals and the plastic laminations. Next, the resulting subassembly is inserted into a central passageway in a wound "Mylar" capacitor body and is then soldered in place to produce a capacitor.

An object of the present invention is to provide new and improved methods of and apparatus for making wound capacitors.

Another object of the present invention is to provide methods of and apparatus for making a terminal subassembly or core for a capacitor having laminations of deformable material coalesced about the opposed ends of terminals.

Still another object of the present invention is to provide methods of making wound capacitors having preformed cores with terminals coalesced to the core.

An additional object of this invention resides in the provision of methods of and apparatus for securing terminals to and between plastic laminations by heating the terminals to coalesce the laminations about the terminals.

A further object of this invention resides in a method of fabricating a capacitor by winding metal coated polyester films on a core having terminals sandwiched between a pair of plastic laminations.

With these and other objects in view, the present invention contemplates a method of making a capacitor core which includes pressing a pair of plastic laminations about a pair of axially aligned terminals and heating the terminals to coalesce the laminations about the terminals.

Additionally, with the foregoing objects in view, the present invention contemplates an apparatus for embedding conductive terminals in a plastic block formed of plastic laminations. The apparatus includes a pair of guideways and spools for feeding plastic strips through the guideways and into the path of a pair of rams moving towards one another. A pair of wire terminals are positioned between the ends of the fed strips and are maintained in such position by nests actuated by one of the rams. Cutting edges are formed on the rams for severing the plastic strips to form laminations. The rams then press the laminations together onto the terminals. Heat is applied to the terminals so that the laminations coalesce about the terminals to hold them therebetween.

Also, with the foregoing objects in view, the present invention contemplates a method of fabricating a wound capacitor wherein a capacitor core, formed by laminating a pair of terminals between two plastic sheets, is inserted into the aperture of a pre-wound capacitor body, and subsequently a conductive block is formed about each terminal extending from the core to engage and electrically connect the capacitor body to the terminals. In the alternative, the capacitor body may be wound on the preassembled capacitor core with subsequent addition of the conductive block about the terminals.

A complete understanding of this invention may be had by reference to the following detailed description when read in conjunction with the accompanying drawings illustrating preferred embodiments thereof, wherein:

FIG. 1 is a perspective view of an assembled capacitor embodying the present invention and manufactured according to a method of this invention;

FIG. 2 is a perspective view of a wound capacitor body;

FIG. 3 is a perspective view of a capacitor core or terminal subassembly manufactured according to a method of this invention;

FIG. 4 is a front elevational view of an apparatus for assembling the capacitor core;

FIG. 5 is a cross-sectional view taken along line 5—5 of FIG. 4 illustrating the feeding, cutting, and pressing of the plastic laminations on the wire terminals;

FIG. 6 is a cross-sectional view taken along line 6—6 of FIG. 4 illustrating the camming of the clamping members to hold the wire terminal in position for assembly;

FIG. 7 is an enlarged fragmentary front view of the apparatus showing the terminals and laminations about to be pressed into an assembly, FIG. 8 is a fragmentary view taken along line 8—8 of FIG. 7 showing the cutting surfaces of the rams in detail; and FIG. 9 is a fragmentary view taken along line 9—9 of FIG. 7 showing the terminal holding nest in detail.

Referring now to FIGS. 1 and 2, an assembled capacitor 11 is shown having the wire leads or terminals 12 extending therefrom and conductive solder blocks 13 formed about the exposed metal ends 14 of a capacitor body 16. The solder blocks 13 mechanically and electrically connect the terminals 12 to the ends 14 of the capacitor body 16.

FIG. 3 shows an assembled capacitor core, generally designated by the numeral 17, having the terminals 12 sandwiched between a pair of coalesced plastic laminations 18. In assembling the capacitor 11, the core 17 is inserted within a passageway 19 of the capacitor body 16. Moreover, the solder blocks 13, in connecting the terminals 12 to the metal ends 14 of the capacitor body 16, also retain the core 17 within the passageway 19 of the capacitor body 16.

Referring to FIG. 4, there is shown an apparatus for assembling the capacitor cores 17. The apparatus includes a pair of rams 21 and 22, having shear surfaces 23 (FIG. 8) formed thereon, connected to eccentric cranks 24 mounted on shafts 26. The shafts 26 are connected through sprockets 27 and a chain 28 to a motor-driven pulley 29 (FIG. 6).

As shown in FIG. 5, a pair of polyester film strips 31, such as "Mylar" strips or the like, are advanced intermittently by feed rollers 32 and 33 from a pair of supply spools 36 and 37 through and beyond a pair of guideways 38 (FIG. 8). The intermittent advancement of the feed rollers 32 and 33 may be explained by referring to FIG. 6. Each of the feed rollers 32 is connected to a drive mechanism, including a one-way clutch 41, the driven element of which is secured to the shaft 42 of the roller 32, and the driving element of which has a gear 43 secured thereto. The gear 43 meshes with a rack 44 that is connected at one end to an adjustable crank 46 mounted on the crank shaft 26 for rotation therewith. A spring pressed roller 47 maintains the rack 44 in engagement with the gear 43. Again, referring to FIGS. 5 and 8, a guide member 48, which forms the inner wall of the guideways 38, has shear edges 49 formed thereon which mate with the shear surfaces 23 on the rams 21 and 22 to sever the strips 31 to form the laminations 18.

Also shown in FIGS. 7 and 9 are terminals 12 shown positioned in a nest 51 formed by a stationary nest member 52 and a movable nest member 53 which is slidably mounted on a pin 54 and urged to a normally open position by a compression spring 55. A flat spring cam member 56 (FIGS. 6, 7, and 9) is mounted on the ram 21 for slidable engagement with a cam surface 57 formed on the movable nest member 53.

Referring again to FIG. 4, heating elements 58 and 59, are shown secured to a base 61 which also supports the entire assembly apparatus. These heating elements 58 and 59 are positioned to support the free unnested end of the terminals 12.

*Operation*

In the operation of this assembling apparatus, a pair of polyester film strips 31 are fed from a pair of spools 36 and 37 by the feed rollers 32 and 33 into the guideways 38 until they project a predetermined distance from the guideways 38 into a space between the rams 21 and 22. A pair of wire terminals 12 are positioned within the nests 51 so that one end of each of the terminals is interposed between the strips 31. The feeding of the strips 31 is accomplished by the intermittent rotation of the feed rollers 32 and 33. This intermittent rotation is imparted to the rollers through the shaft 42 which is connected to the one-way clutch 41. The clutch 41 in turn is connected to a gear 43 which meshes with a rack 44. The rack 44 is secured to and driven by an adjustable crank 46 which is mounted on shaft 26. The shaft 62 is driven through a sprocket 27 formed on the shaft 26 which is connected by a chain 28 to a motor-driven pulley 29.

Rotation of the feed roller shaft 42 through the mechanism just described thereby rotates the feed rollers 32 and 33 to advance the strips 31 into the path of the rams 21 and 22. At the same time, rotation of the pulley 29, by imparting motion to the crank shaft 26 through the chain 28 and sprocket 27, also reciprocates the cranks 24 mounted on the shaft 26 to move the rams 21 and 22 toward each other. As ram 21 moves downwardly each cam member 56 slides along a cam surface 57 urging a movable nest member 53 toward a stationary nest member 52 to securely hold a terminal 12 therebetween. Further motion of rams 21 and 22 brings the shearing surfaces 23 thereof into contact with the strips 31; whereupon, the surfaces 23 in cooperation with the shear edges 49 of the guide member 48 sever segments of the strips 31, forming plastic laminations 18. At the same time, the faces 34 of the rams 21 and 22 press the laminations 18 over the adjacent end portions of terminals 12. Heat which is being applied to the terminals 12 through the heating elements 58 and 59 (FIG. 4) in conjunction with the pressure applied by the rams 21 and 22 coalesces the plastic laminations to securely hold the terminals 12 sandwiched between the laminations 18. An even greater bond may be affected between the terminals 12 and the laminations 18 by preforming the terminals so as to provide flattened, bent, or enlarged end portions which are sandwiched between the laminations. The stroke of the rams 21 and 22 may be adjusted to effect the flattening of the end portions of the terminals 12 during the fabrication of the core 17.

Further movement of the crank shaft 26 starts the rams 21 and 22 to withdraw, thereby releasing the assembled capacitor core 17 and at the same time withdrawing the flat spring cam members 56 from engagement with the movable nest members 53 to release the terminals 12 held therein so that the assembled capacitor core 17 may be removed from the apparatus. Further rotation of the motor-driven pulley 29 begins a subsequent feeding of the strip 31 and thus initiates another cycle of operation.

Although the operation of the apparatus just described represents a preferred embodiment for making the new and improved capacitor core of this invention, it should be readily apparent that other methods could be used to perform these operations. For example, a simple method would entail using any cutting instrument to cut the plastic strips into laminates and after inserting terminals between the laminations, an application of heat and pressure from any source such as a soldering iron would coalesce the lamination about the end portions of the terminals.

In the assembling of the capacitor 11 (FIGS. 1, 2, and 3) the capacitor body 16 is formed by the winding of a pair of metal-coated polyester film tapes 15, such as "Mylar" tapes or the like, to form capacitor body 16. The winding of these tapes can be accomplished by any well-known winding method, but must be accomplished in such a manner so as to leave the passageway 19 within the capacitor body 16 to accommodate insertion of the capacitor core 17 or terminal subassembly. Next, the capacitor core 17 which has been assembled by the apparatus previously described is inserted into the passageway 19 so that the core 17 is enclosed within the capacitor body 16, and the terminals 12 are extending from the axial passageway 19 of the capacitor 11. The above core insertion process may be accomplished by automatic machinery or may be done by a hand operation. Upon completion of the core insertion into the capacitor, the assembly is flattened by any convenient method and molten metal is sprayed or molded onto the ends of the capacitor body 16, as shown in FIG. 1, to form a conductive block 13 about each terminal 12 extending from the core 17. The conductive block 13 bond the core 17, with the terminals 12 extending therefrom, to the capacitor body 16 and at the same time electrically connect the exposed metal 14 at respective ends of the capacitor body 16 to the terminals 12.

An alternative method of assemblying the capacitor 11 comprises winding the capacitor-forming "Mylar" tapes 15 about the preassembled capacitor core 17 to produce the wound capacitor body 16 utilizing the core 17, with terminals 12 extending therefrom, as a mandrel in the winding operation. Subsequent to the winding, the capacitor body 16 is flattened and conductive material 13 is sprayed or molded onto the ends of the capacitor to form a bond between the core 17, with terminals 12 extending therefrom, and the wound "Mylar" tapes. The conductive material also serves to electrically connect the exposed ends of the metal-coated "Mylar" tapes to the terminals 12. The spraying or molding of the conductive material onto the capacitor assembly may be accomplished by use of an automatic machine or may be done by a hand operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of fabricating a wound capacitor, which comprises the steps of:
   placing axially spaced terminals between two layers of plastic material with the ends of the terminals extending beyond the layers,
   pressing the two layers of plastic material together with the terminals sandwiched therein,
   applying energy to the extending ends of the terminals to heat and coalesce said layers over the terminals to bind the terminals within the layers of plastic,
   winding a pair of sheets of metal coated plastic material to form a roll having a central opening and leaving the metal coating of each sheet exposed on opposite ends of the roll,
   positioning the plastic layers with terminals extending within the central opening with the exposed terminals projecting from the central opening, and
   forming a conductive block about each terminal to mechanically engage and electrically connect the exposed metal at the respective ends of the roll to the terminals.

2. A method of fabricating a wound capacitor by rolling the capacitor sheets on the terminal core, which comprises the steps of:
   placing terminals between two layers of plastic with the ends of the terminals extending from between the layers,
   pressing the two layers together with the terminals sandwiched therebetween,
   applying energy to the extending ends of the terminals to heat and coalesce the plastic layers about the terminals to bind the terminals within the layers of plastic forming a terminal core,
   rolling a pair of sheets of metal coated plastic material on said terminal core and leaving the metal coating of each sheet exposed on opposite ends of the roll, and
   forming a conductive block about each terminal extending from the core to mechanically engage and electrically connect the exposed metal at the respective ends of the roll to the terminals.

3. An apparatus for securing a pair of terminals to a plastic block, which comprises:
   a pair of gripping devices for holding the pair of terminals spaced from and projecting toward each other,
   a pair of rams mounted between said gripping devices for movement toward and away from each other,
   a die block having a pair of spaced slotted passageways therethrough to receive a pair of strips of plastic material and to position projecting ends of the strips between said rams,
   means for mounting said die block to position a face thereof in shearing cooperation with the side faces of the rams,
   means for advancing the strips through said passageways and between said rams to sandwich therein a pair of terminals positioned in said gripping devices,
   means for advancing the rams toward each other to sever the projecting ends of said strips to form and press a pair of laminations about said termnials, and
   means for heating the terminals to coalesce the pressed laminations about said terminals.

4. An apparatus for embedding conductive terminals in a plastic block, which comprises:
   a frame,
   a pair of opposed rams mounted on said frame for reciprocating movement,
   guide means mounted on said frame adjacent said ram and having shearing surfaces,
   means operated by the movement of said rams for feeding a strip of plastic material through said guide means onto the face of each of said rams,
   cutting surfaces formed on each of said rams for coacting with said shearing surfaces on said guide means to sever said plastic strip into a pair of segments upon movement of said rams,
   normally open clamping means mounted on said frame for locating a pair of axially aligned terminals spaced between the adjacent plastic segments so that ends of the terminals project beyond the segments,
   camming means on said ram for closing said clamping means to grip said terminals,
   flat surfaces formed on said ram for pressing said plastic segments together with said terminals sandwiched therebetween and for deforming the ends of said terminals pressed between said segments, and
   means mounted on said frame for supporting the terminals intermediate the clamped and pressed ends and for applying heat to said pressed plastic segments to coalesce said segments about said terminals.

5. A method of fabricating a core for a capacitor comprising the steps of:
   positioning a pair of plastic laminations about a pair of axially aligned terminals with a portion of the terminals projecting from the lamination,
   pressing the pair of plastic laminations together with the terminals sandwiched therebetween, and simultaneously applying energy to the projecting ends of the terminals to heat and coalesce said laminations to secure said terminals between said laminations.

6. Apparatus for fabricating a capacitor core comprising:
   means for advancing a pair of plastic strips about a pair of plastic strips about a pair of axially aligned terminals so that the ends of said terminals project out from between said strips,
   means for pressing said plastic strips together about said terminals, and
   means for simultaneously heating said ends of said terminal so that said plastic strips coalesce to secure said terminals therebetween.

7. A method of fabricating a core for a capacitor which comprises the steps of:
   clamping a pair of terminals in axial alignment with a space between the adjacent ends thereof;
   positioning a pair of strips of thermoplastic material over a portion of the terminals so that the adjacent terminal ends are interposed between the strips and the other ends of the terminals project outwardly from between the strips;
   pressing the strips about the terminals; and
   heating the projecting ends of the terminals to heat and coalesce the strips about the terminals.

8. A method of fabricating a core for a capacitor which comprises the steps of:
   positioning a pair of terminals in axial alignment with a space between the adjacent ends thereof;
   feeding a pair of strips of plastic over the terminals so that the adjacent ends of the terminals are interposed between the strips and the other ends of the terminals project outwardly from between the strips;
   clamping the projecting ends of the terminals;
   cutting segments from the plastic strips;
   pressing the plastic segments about the terminals to deform the terminal ends positioned between the plastic segments; and
   applying heat to the terminals intermediate the clamped and pressed ends thereof to coalesce the pressed plastic segments about the terminals.

References Cited
UNITED STATES PATENTS

| | | | |
|---|---|---|---|
| 2,101,896 | 12/1937 | Burlingame | 317—260 |
| 2,464,627 | 3/1949 | Weiss | 156—264 |
| 2,597,885 | 5/1952 | Marks | 156—264 |
| 3,068,135 | 12/1962 | Bower | 156—179 |
| 3,082,292 | 3/1963 | Gore | 156—179 |
| 3,156,854 | 11/1964 | Beyer | 317—260 |

EARL M. BERGERT, *Primary Examiner.*

LARAMIE E. ASKIN, JOHN F. BURNS, DOUGLAS J. DRUMMOND, *Examiners.*

D. J. BADER, *Assistant Examiner.*